(12) United States Patent
Couchot et al.

(10) Patent No.: US 11,028,300 B1
(45) Date of Patent: Jun. 8, 2021

(54) ENVIRONMENTALLY FRIENDLY REFRIGERANT COMPOSITIONS

(71) Applicants: David L. Couchot, Mason, OH (US); Sankara N. Ramanan, Raleigh, NC (US)

(72) Inventors: David L. Couchot, Mason, OH (US); Sankara N. Ramanan, Raleigh, NC (US)

(*) Notice: Subject to any disclaimer, the term of this patent is extended or adjusted under 35 U.S.C. 154(b) by 0 days.

(21) Appl. No.: 17/023,045

(22) Filed: Sep. 16, 2020

(51) Int. Cl.
C09K 5/04 (2006.01)

(52) U.S. Cl.
CPC .............. *C09K 5/045* (2013.01); *C09K 5/042* (2013.01); *C09K 2205/122* (2013.01); *C09K 2205/40* (2013.01)

(58) Field of Classification Search
CPC .......................... C09K 5/045; C09K 2205/122
See application file for complete search history.

(56) References Cited

U.S. PATENT DOCUMENTS

| | | | |
|---|---|---|---|
| 6,526,764 B1 | 3/2003 | Singh | |
| 6,655,160 B2 | 12/2003 | Roberts | |
| 7,229,567 B2 | 6/2007 | Roberts | |
| 7,258,813 B2 | 8/2007 | Roberts | |
| 7,713,434 B2 | 5/2010 | Roberts | |
| 7,771,610 B2 | 8/2010 | Roberts | |
| 7,837,894 B2 | 11/2010 | Roberts | |
| 8,196,395 B2 | 6/2012 | Fong | |
| 8,961,811 B2 | 2/2015 | Minor | |
| 8,999,191 B2 | 4/2015 | Yost | |
| 9,435,575 B2 | 1/2016 | Harkins | |
| 2003/0062508 A1 | 4/2003 | Singh | |
| 2008/0265204 A1 | 10/2008 | Roberts | |
| 2009/0314015 A1 | 12/2009 | Minor | |
| 2010/0011791 A1 | 1/2010 | Strickland | |

(Continued)

FOREIGN PATENT DOCUMENTS

| | | |
|---|---|---|
| FR | 2968574 B1 | 6/2012 |
| WO | 2009151669 | 12/2009 |

OTHER PUBLICATIONS

Freon™ MO99™ (R-438A) and Freon™ Nu-22B™ (R-422B) Refrigerents Retrofit Guidelines, The Chemours Company FC (Jun. 2019).

(Continued)

*Primary Examiner* — John R Hardee
(74) *Attorney, Agent, or Firm* — Michael Best & Friedrich LLP (57) ABSTRACT

A refrigerant composition includes R125 (pentafluoroethane), R134a (1,1,1,2-tetrafluoroethane), R600a (isobutane) and a polyol ester (POE) lubricant. In one exemplary embodiment, the refrigerant includes about 53-57 wt % R125, about 40-44 wt % R134a, about 1-5 wt % R600a and no more than about 1 wt % POE. In another embodiment, the refrigerant composition includes about 54-56% R125, about 41-43 wt % R134a, about 2-4% R600a and about 0.3-0.7 wt % POE. In yet another embodiment, the refrigerant composition includes about 54.63 wt % R125, about 41.72 wt % R134a, about 2.98 wt % R600a and about 0.67 wt % POE. Manufacturing the refrigerant composition includes charging a vessel with about 53-57 wt % R125, about 44 wt % R134a, about 1-5 wt % R600a to form as 100 wt % charge, and then injecting no more than about 1 wt % POE.

18 Claims, 6 Drawing Sheets

(56) References Cited

U.S. PATENT DOCUMENTS

| | | |
|---|---|---|
| 2010/0065773 A1 | 3/2010 | Bivens |
| 2010/0101245 A1 | 4/2010 | Bivens |
| 2011/0017942 A1 | 1/2011 | Bivens |
| 2013/0200294 A1* | 8/2013 | Carr ....................... C09K 5/042 252/68 |
| 2013/0255302 A1 | 10/2013 | Tieken |
| 2014/0264146 A1 | 9/2014 | Yost |

OTHER PUBLICATIONS

Insco website, Chemours™ NU-22B, https://www.insco.com/2579900/product/chemourstrade-nu-22b;jsessionid=96542974AD38F08241C12456C13ED528 (last visited Dec. 3, 2020).

* cited by examiner

FIG. 6 MANUFACTURE OF THE REFRIGERANT OF THE DISCLOSURE.

FIG. 7 METHOD OF FILLING AN APPARATUS DESIGNED FOR R22 WITH THE REFRIGERANT OF THE DISCLOSURE.

ENVIRONMENTALLY FRIENDLY REFRIGERANT COMPOSITIONS

FIELD OF DISCLOSURE

The present disclosure relates generally to environmentally friendly refrigerant compositions that include pentafluoroethane, 1,1,1,2-tetrafluoroethane, isobutane and lubricant.

BACKGROUND

Refrigeration and air conditioning equipment frequently require large amounts of cooling. Previously, R22 (CHClF$_2$) has been used for this purpose. However, R22 depletes the ozone layer and is being phased out, in accordance with the Montreal protocol. There is a need for an alternative refrigerant that has similar properties to R22, but is not an ozone depleter. Of particular concern is that the temperature/vapor pressure relationship for such a refrigerant should be sufficiently similar to R22 that it can be used in R22 equipment without having to change the control systems which are usually programmed in the factory making the equipment.

This is of particular concern for systems that have sensitive control devices, which rely on both the inlet pressure to the expansion valve and the outlet pressure. These control systems are based on R22 properties. Therefore, if an R22 substitute does not have a temperature/vapor pressure behavior which is similar to R22, the system will not operate correctly.

By similar, it is meant that the vapor pressure of the substitute should not differ from that of R22 by more than ±12% and preferably not more than ±6% at any given mean evaporating temperature between −40° C. to +10° C. It is also important that any such refrigerant has a similar capacity and efficiency as R22. Similar capacity means a capacity that is no more than 20% lower than that of R22 and preferably not more than 10% lower than R22 at mean evaporating temperatures between −35° C. to −28° C. Similar efficiency means not more than 10% lower than that of R22 and preferably not more than 5% lower at mean evaporating temperatures between −35° C. to −28° C.

Alternative refrigerants based upon fluorocarbons have been developed to try to match the performance of R22. However, the alternative fluorocarbon refrigerants known in the art do not have performances that match that of R22. Accordingly, there is a need for alternative refrigerant compositions that combine high cooling efficiency with low environmental impact. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Briefly described, an embodiment of the present disclosure relates to a refrigerant composition that includes R125 (pentafluoroethane), R134a (1,1,1,2-tetrafluoroethane), R600a (isobutane) and a polyol ester (POE) lubricant.

In one embodiment, the present disclosure pertains to a refrigerant composition that includes about 53-57 wt % R125, about 40-44 wt % R134a, about 1-5 wt % R600a and no more than about 1 wt % POE.

In another embodiment, the refrigerant composition includes about 54-56% R125, about 41-43 wt % R134a, about 2-4% R600a and about 0.1-1 wt % POE.

In another embodiment, the refrigerant composition includes about 54-56% R125, about 41-43 wt % R134a, about 2-4% R600a and about 0.3-0.7 wt % POE.

In another embodiment, the refrigerant composition includes about 54-56% R125, about 41-43 wt % R134a, about 2-4% R600a and about 0.1-1 wt % POE.

In another embodiment, the refrigerant composition includes about 54.6 wt % R125, about 41.7 wt % R134a, about 3.0 wt % R600a and about 0.7 wt % POE.

In another embodiment, the refrigerant composition includes about 54.63 wt % R125, about 41.72 wt % R134a, about 2.98 wt % R600a and about 0.67 wt % POE.

In another embodiment, the POE is configured to have a viscosity of about 32 cSt at 40° C. (104° F.) and about 6 cSt at 100° C. (212° F.), with a pour point of about −46° C. (−51° F.), a density of about 1 g/ml at 20° C. (68° F.), a flash point of about 258° C. (496° F.) and an acid value of less than about 0.1 mg KOH/g.

In another embodiment, the POE is configured to have a viscosity of about 32.5 cSt at 40° C. (104° F.) and about 5.8 cSt at 100° C. (212° F.), with a pour point of about −46° C. (−51° F.), a density of about 1.0 g/ml at 20° C. (68° F.), a flash point of about 258° C. (496° F.) and an acid value of less than about 0.1 mg KOH/g.

In another embodiment, the POE is configured to have a viscosity of about 32.5 cSt at 40° C. (104° F.) and about 5.8 cSt at 100° C. (212° F.), with a pour point of about −46° C. (−51° F.), a density of about 0.98 g/ml at 20° C. (68° F.), a flash point of about 258° C. (496° F.) and an acid value of less than about 0.05 mg KOH/g.

In another embodiment, the POE is configured to have a viscosity of about 32.5 cSt at 40° C. (104° F.) and about 5.8 cSt at 100° C. (212° F.), with a pour point of about −46° C. (−51° F.), a density of about 0.977 g/ml at 20° C. (68° F.), a flash point of about 258° C. (496° F.) and an acid value of less than about 0.05 mg KOH/g.

In another embodiment, the refrigerant composition of the disclosure has a pressure of about 136 psi at 70° F. (21° C.), a global warming potential of about 2525 compared to carbon dioxide, and a theoretical boiling point of about −36° F. (−38° C.).

In another embodiment, the refrigerant composition of the disclosure has a pressure of about 136.41 psi at 70° F. (21° C.), a global warming potential of about 2525.7 compared to carbon dioxide, and a theoretical boiling point of about −36.22° F. (−37.90° C.).

In one embodiment, a method for manufacturing a refrigerant includes charging a vessel with about 55 wt % pentafluoroethane, about 42 wt % 1,1,1,2-tetrafluoroethane and about 3 wt % isobutane for a 100% charge; and injecting into the vessel no more than about 1 wt % POE, based on the 100% charge.

In another embodiment, the method for manufacturing a refrigerant includes charging a vessel with about 55 wt % pentafluoroethane, about 42 wt % 1,1,1,2-tetrafluoroethane and about 3 wt % isobutane for a 100% charge; and injecting into the vessel up to 1 wt % POE, based on the 100% charge.

In another embodiment, the method for manufacturing a refrigerant includes charging a vessel with about 55 wt % pentafluoroethane, about 42 wt % 1,1,1,2-tetrafluoroethane and about 3 wt % isobutane for a 100% charge; and injecting into the vessel about 0.3-0.7 wt % POE, based on the 100% charge.

In another embodiment, the method for manufacturing a refrigerant includes charging a vessel with about 55 wt % pentafluoroethane, about 42 wt % 1,1,1,2-tetrafluoroethane and about 3 wt % isobutane for a 100% charge; and injecting into the vessel about 0.7 wt % POE, based on the 100% charge.

In one embodiment, a method for manufacturing a refrigerant includes charging a vessel with about 55 wt % pentafluoroethane, about 42 wt % 1,1,1,2-tetrafluoroethane and about 3 wt % isobutane for a 100% charge; and injecting into the vessel about 0.67 wt % POE, based on the 100% charge.

In one embodiment, a method for manufacturing a refrigerant includes charging a vessel with about 55 wt % pentafluoroethane, about 42 wt % 1,1,1,2-tetrafluoroethane and about 3 wt % isobutane for a 100% charge; and injecting into the vessel about 0.675 wt % POE, based on the 100% charge.

An embodiment of the disclosure relates to a method for filling an apparatus designed for use with a chlorodifluoromethane refrigerant that includes selecting a substitute refrigerant composition comprising about 53-57 wt % pentafluoroethane, about 40-44 wt % 1,1,1,2-tetrafluoroethane, about 1-5 wt % isobutane, and about 0.1-1 wt % POE; Supplying the substitute refrigerant composition under pressure in a cylinder fitted with an outlet compatible with a chlorodifluoromethane recharging manifold of the apparatus; and Adding to the apparatus the substitute refrigerant composition.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to exemplary embodiments thereof. In the following description, numerous specific details are set forth in order to provide a thorough understanding of the present disclosure. However, it will be readily apparent to one of ordinary skill in the art that the present disclosure may be practiced without limitation to these specific details.

The disclosure is a refrigerant composition of R125, R134a, R600a and POE that performs similar to R22. In one embodiment, the composition includes about 53-57 wt % R125, 40-44 wt % R134a, 1-5 wt % R600a and no more than 1 wt % POE. In another embodiment, the refrigerant composition includes about 54-56% R125, 41-43 wt % R134a, 2-4 wt % R600a and 0.3-0.7 wt % POE. In yet another embodiment, the refrigerant composition includes about 54.6 wt % R125, 41.7 wt % R134a, 3.0 wt % R600a and 0.7 wt % POE. In but yet another embodiment, the refrigerant composition includes 54.63 wt % R125, 41.72 wt % R134a, 2.98 wt % R600a and 0.67 wt % POE.

The composition of the present disclosure was developed from a formulation, which is about 55.0 wt % R125, about 42.0 wt % R134a and about 3.0 wt % R600a. In the present disclosure, it was unexpectedly found that the addition of POE yields results that very closely track the performance of R22. POE is a synthetic lubricant and has the advantages of high purity combined with low toxicity. POE offers reliability and energy efficiency in compressors. POE provides effective wear protection for bearing surfaces, increased system life and improved efficiency. The combination of low temperature characteristics and chemical and thermal stability enable the use of POE over wide operating temperature ranges.

In an exemplary embodiment, a vessel is charged with 16.8 lb of R134a, 22.0 lb of R125 and 1.2 lb of R600a to make a 100% charge. Then 0.27 lb of POE was injected. The results are shown in Table 1.

TABLE 1

Refrigerant Composition.

| Product | Generic Name | Percentage |
| --- | --- | --- |
| R134a | 1,1,1,2-Tetrafluoroethane | 41.72% |
| R125 | Pentafluoroethane | 54.63% |
| R600a | Isobutane | 2.98% |
| POE Lubricant | POE Lubricant | 0.67% |
| | Pressure at 70° F. | 136.4 psia |
| | GWP (Global Warming Potential) | 2525 |
| | Theoretical BP | −32.22° F. |

In another embodiment, the POE lubricant has a viscosity of about 32.5 cSt at 40° C. (104° F.) and about 5.8 cSt at 100° C. (212° F.), with a pour point of about −46° C. (−50.8° F.), a density of about 0.977 g/ml at 20° C. (68° F.), a flash point of about 258° C. (496° F.) and an acid value of about <0.05 mg KOH/g.

In another embodiment, the POE lubricant has a viscosity of about 18.9 cSt at 40° C. (104° F.) and 4.2 cSt at 100° C. (212° F.), with a pour point of −52° C. (−62° F.), a density of 0.995 g/ml at 20° C. (68° F.), a flash point of 222° C. (432° F.) and an acid value of <0.05 mg KOH/g.

In another embodiment, the POE lubricant has a viscosity of about 45.3 cSt at 40° C. and 7.1 cSt at 100° C., with a pour point of −46° C. (−51° F.), a density of 0.977 g/ml at 20° C. (68° F.), a flash point of 270° C. (518° F.) and an acid value of <0.05 mg KOH/g.

In another embodiment, the POE can be a synthetic POE compatible for use in refrigeration and air-conditioning compressors using HFC refrigerants, as well as for OEM retrofitting operations. The POE forms a single clear phase, i.e., is miscible with R125/R134a/R600a formulation. Miscibility lowers the viscosity of the lubricant carried through the system, so that the lubricant can more efficiently return to the compressor. In contrast, existing mineral oil lubricants are not miscible with HFCs. The composition of the present disclosure is compatible with all types of compressors, including reciprocating and rotary in residential air conditioning, and centrifugal, reciprocating and scroll in industrial and commercial refrigeration and air conditioning.

Pressure/temperature curves, enthalpy curves and entropy curves for the composition of the present disclosure and R22 were obtained using the NIST REFPROP software. The disclosed composition pressure/temperature data and the R22 pressure/temperature data are described in Table 2. The results for the comparison of the present disclosure to R22 is in Table 2.

TABLE 2

Pressure/Temperature Data of R22 and the Disclosed Composition.

| Temperature (° F.) | R22 Liquid Phase Pressure (psia) | Disclosed Composition Liquid Phase Pressure (psia) |
|---|---|---|
| −60 | 8.836 | 9.082 |
| −55 | 10.190 | 10.461 |
| −50 | 11.703 | 12.001 |
| −45 | 13.389 | 13.717 |
| −40 | 15.262 | 15.620 |
| −35 | 17.336 | 17.726 |
| −30 | 19.624 | 20.048 |
| −25 | 22.142 | 22.601 |
| −20 | 24.905 | 25.401 |
| −15 | 27.929 | 28.464 |
| −10 | 31.230 | 31.805 |
| −5 | 34.824 | 35.440 |
| 0 | 38.728 | 39.388 |
| 5 | 42.959 | 43.664 |
| 10 | 47.536 | 48.287 |
| 15 | 52.475 | 53.274 |
| 20 | 57.794 | 58.645 |
| 25 | 63.514 | 64.416 |
| 30 | 69.651 | 70.608 |
| 35 | 76.225 | 77.239 |
| 40 | 83.255 | 84.330 |
| 45 | 90.761 | 91.900 |
| 50 | 98.763 | 99.970 |
| 55 | 107.280 | 108.560 |
| 60 | 116.330 | 117.690 |
| 65 | 125.940 | 127.390 |
| 70 | 136.130 | 137.660 |
| 75 | 146.920 | 148.550 |
| 80 | 158.330 | 160.070 |
| 85 | 170.380 | 172.240 |
| 90 | 183.090 | 185.080 |
| 95 | 196.490 | 198.630 |
| 100 | 210.610 | 212.910 |
| 105 | 225.460 | 227.930 |
| 110 | 241.060 | 243.740 |
| 115 | 257.450 | 260.350 |
| 120 | 274.650 | 277.790 |
| 125 | 292.680 | 296.100 |

Figure 1:
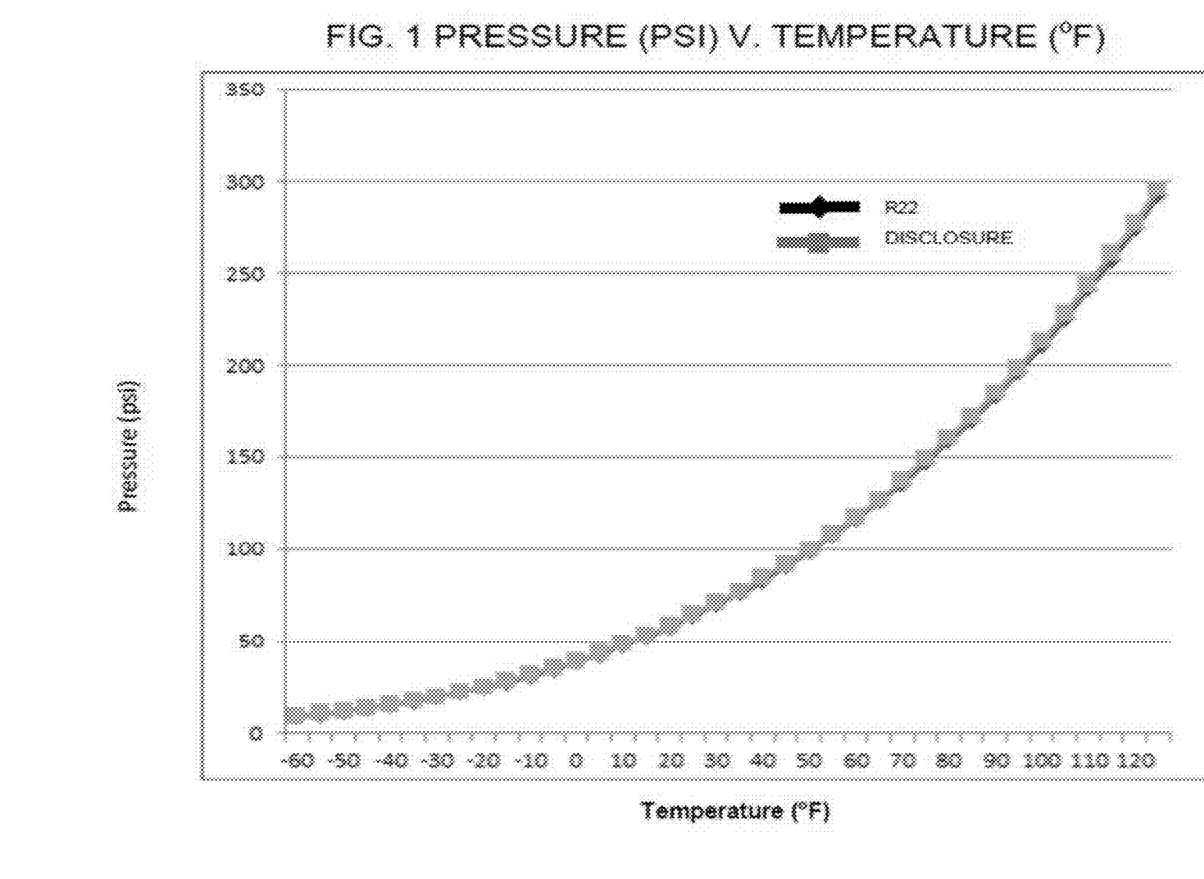
FIG. 1 depicts the pressure-temperature curve of the refrigerant composition of the disclosure compared to R22.

The curves of the R22 data and the disclosed composition data of Table 2 are graphed in FIG. 1, in which a skilled artisan would readily recognize a very close fit in the pressure/temperature curve compared to R22. In addition to R-125, R-134a, R600a and POE, the compositions of the disclosure may also contain one or more additives such as oxidation resistance and thermal stability enhancers, corrosion inhibitors, metal deactivators, lubricity additives, viscosity index enhancers, pour and/or floc point depressants, detergents, dispersants, antifoaming agents, anti-wear agents, extreme pressure resistant additives, and combinations of two or more thereof.

The disclosed composition entropy data and the R22 entropy data were obtained using the NIST REFPROP program. These results are described in Table 3. Results for the entropy of the composition of the present disclosure compared to R22 were calculated using the REFPROP program.

TABLE 3

Liquid Entropy Data of R22 and the Disclosed Composition.

| Temperature (° F.) | R22 Liquid Phase Entropy (kJ/gR) | Disclosed Composition Liquid Phase Entropy (kJ/gR) |
|---|---|---|
| −60 | 0.00042770 | 0.00041166 |
| −55 | 0.00043515 | 0.00041999 |
| −50 | 0.00044253 | 0.00042825 |
| −45 | 0.00044984 | 0.00043644 |
| −40 | 0.00045708 | 0.00044456 |
| −35 | 0.00046425 | 0.00045261 |
| −30 | 0.00047137 | 0.00046060 |
| −25 | 0.00047842 | 0.00046853 |
| −20 | 0.00048542 | 0.00047641 |
| −15 | 0.00049237 | 0.00048423 |
| −10 | 0.00049927 | 0.00049199 |
| −5 | 0.00050612 | 0.00049971 |
| 0 | 0.00051293 | 0.00050739 |
| 5 | 0.00051969 | 0.00051502 |
| 10 | 0.00052641 | 0.00052260 |
| 15 | 0.00053309 | 0.00053015 |
| 20 | 0.00053974 | 0.00053766 |
| 25 | 0.00054635 | 0.00054514 |
| 30 | 0.00055293 | 0.00055259 |
| 35 | 0.00055948 | 0.00056000 |
| 40 | 0.00056600 | 0.00056739 |
| 45 | 0.00057250 | 0.00057476 |
| 50 | 0.00057897 | 0.00058210 |
| 55 | 0.00058543 | 0.00058943 |
| 60 | 0.00059186 | 0.00059674 |
| 65 | 0.00059827 | 0.00060404 |
| 70 | 0.00060467 | 0.00061133 |
| 75 | 0.00061106 | 0.00061862 |
| 80 | 0.00061744 | 0.00062591 |
| 85 | 0.00062381 | 0.00063320 |
| 90 | 0.00063018 | 0.00064051 |
| 95 | 0.00063655 | 0.00064782 |
| 100 | 0.00064293 | 0.00065516 |
| 105 | 0.00064931 | 0.00066253 |
| 110 | 0.00065570 | 0.00066993 |
| 115 | 0.00066211 | 0.00067738 |
| 120 | 0.00066855 | 0.00068488 |
| 125 | 0.00067501 | 0.00069246 |

Figure 2:
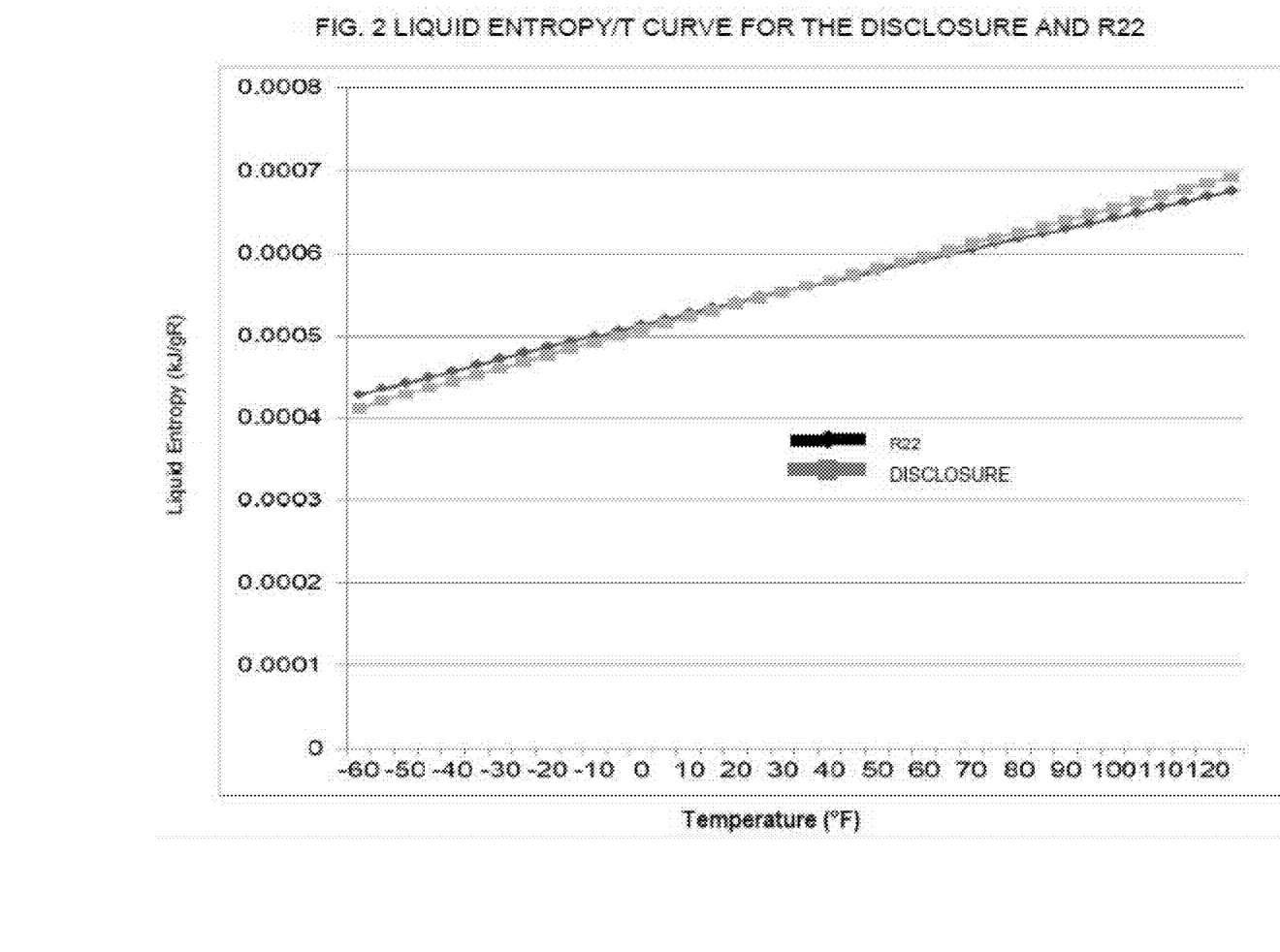
FIG. 2 depicts the liquid entropy curve of the refrigerant composition of the disclosure compared to R22.

The curves of the R22 entropy data and the disclosed composition entropy data of Table 3 are graphed in FIG. 2, in which a skilled artisan would readily recognize a very close fit between the disclosed composition entropy curve and the R22 entropy curve.

The disclosed composition enthalpy data and the R22 enthalpy data was also obtained using the NIST REFPROP program. These results are described by Table 4.

TABLE 4

Liquid Enthalpy Data of R22 and the Disclosed Composition.

| Temperature (° F.) | R22 Liquid Phase Enthalpy (kJ/g) | Disclosure Composition Liquid Phase Enthalpy (kJ/g) |
|---|---|---|
| −60 | 0.14283 | 0.13567 |
| −55 | 0.14583 | 0.13903 |
| −50 | 0.14884 | 0.14240 |
| −45 | 0.15186 | 0.14578 |
| −40 | 0.15489 | 0.14918 |
| −35 | 0.15793 | 0.15259 |
| −30 | 0.16098 | 0.15601 |
| −25 | 0.16404 | 0.15945 |
| −20 | 0.16711 | 0.16291 |
| −15 | 0.17020 | 0.16638 |
| −10 | 0.17330 | 0.16987 |
| −5 | 0.17642 | 0.17338 |
| 0 | 0.17955 | 0.17691 |
| 5 | 0.18270 | 0.18046 |
| 10 | 0.18586 | 0.18403 |
| 15 | 0.18904 | 0.18762 |
| 20 | 0.19224 | 0.19123 |
| 25 | 0.19546 | 0.19487 |
| 30 | 0.19870 | 0.19853 |
| 35 | 0.20196 | 0.20222 |
| 40 | 0.20524 | 0.20593 |
| 45 | 0.20854 | 0.20967 |
| 50 | 0.21187 | 0.21344 |
| 55 | 0.21522 | 0.21724 |
| 60 | 0.21860 | 0.22108 |
| 65 | 0.22200 | 0.22494 |
| 70 | 0.22543 | 0.22885 |
| 75 | 0.22890 | 0.23279 |
| 80 | 0.23239 | 0.23678 |
| 85 | 0.23591 | 0.24080 |
| 90 | 0.23947 | 0.24488 |
| 95 | 0.24307 | 0.24900 |
| 100 | 0.24671 | 0.25318 |
| 105 | 0.25039 | 0.25742 |
| 110 | 0.25411 | 0.26172 |
| 115 | 0.25788 | 0.26609 |
| 120 | 0.26170 | 0.27053 |
| 125 | 0.26558 | 0.27507 |

Figure 3:
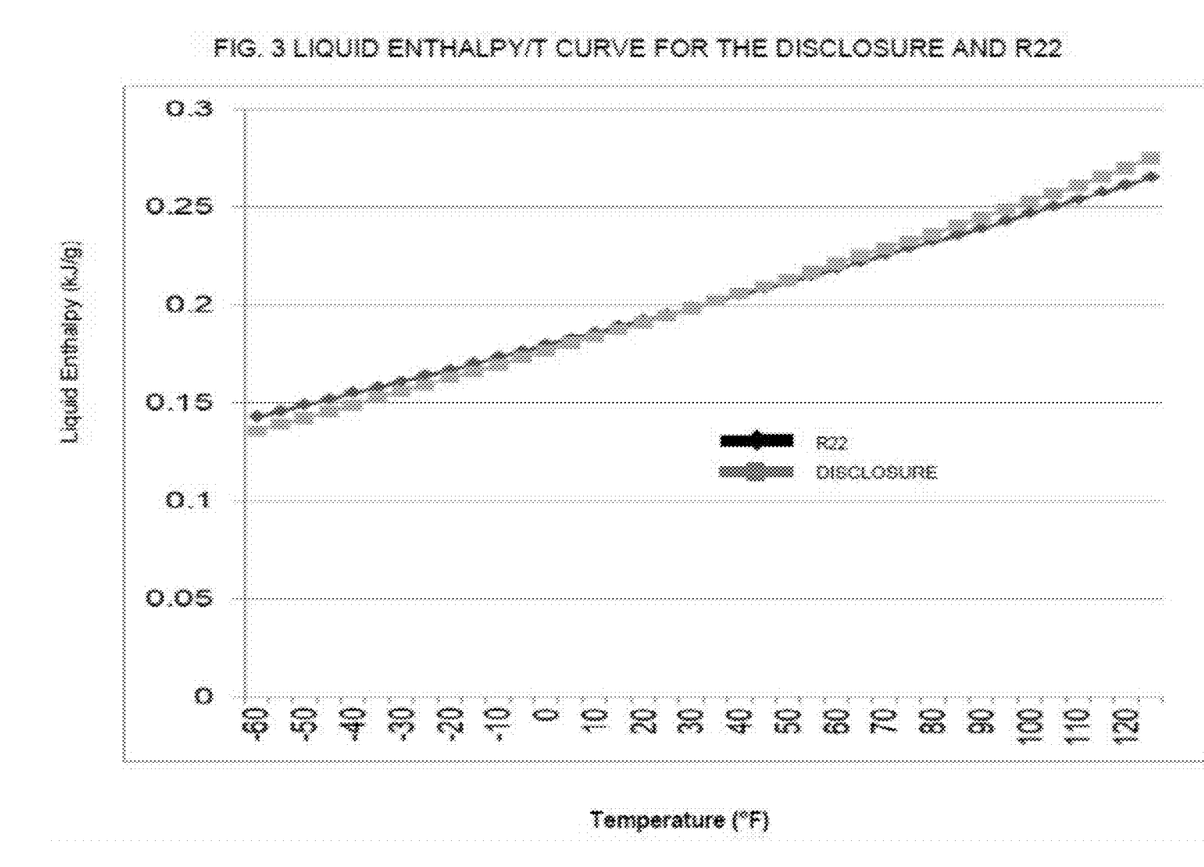
FIG. 3 depicts the liquid enthalpy curve of the refrigerant composition of the disclosure compared to R22.

The curves of the disclosed composition enthalpy data and the R22 enthalpy data are graphed in FIG. 3, where a skilled artisan would readily recognize that the disclosed composition curve is very close to the R22 enthalpy curve, especially about the midrange.

Characteristic data for the refrigerant composition of the disclosure is described in Table 5:

TABLE 5

Disclosed Composition Properties Data.

| Temp (° F.) | Liquid Phase Pressure (psia) | Vapor Phase Pressure (psia) | Liquid Phase Density (g/cm3) | Vapor Phase Density (g/cm3) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|---|---|---|---|
| −60 | 9.082 | 6.6168 | 1.4283 | 0.0027475 | 0.13567 | 0.33385 | 0.00041166 | 0.00091455 |
| −55 | 10.461 | 7.7301 | 1.4197 | 0.0031791 | 0.13903 | 0.33558 | 0.00041999 | 0.00091241 |
| −50 | 12.001 | 8.9886 | 1.4110 | 0.0036629 | 0.14240 | 0.33731 | 0.00042825 | 0.00091042 |
| −45 | 13.717 | 10.406 | 1.4023 | 0.0042032 | 0.14578 | 0.33904 | 0.00043644 | 0.00090857 |
| −40 | 15.620 | 11.995 | 1.3935 | 0.0048046 | 0.14918 | 0.34076 | 0.00044456 | 0.00090685 |
| −35 | 17.726 | 13.771 | 1.3846 | 0.0054718 | 0.15259 | 0.34247 | 0.00045261 | 0.00090526 |
| −30 | 20.048 | 15.748 | 1.3757 | 0.0062101 | 0.15601 | 0.34418 | 0.00046060 | 0.00090379 |
| −25 | 22.601 | 17.942 | 1.3666 | 0.0070245 | 0.15945 | 0.34588 | 0.00046853 | 0.00090243 |
| −20 | 25.401 | 20.369 | 1.3575 | 0.0079207 | 0.16291 | 0.34757 | 0.00047641 | 0.00090117 |
| −15 | 28.464 | 23.044 | 1.3483 | 0.0089045 | 0.16638 | 0.34926 | 0.00048423 | 0.00090001 |
| −10 | 31.805 | 25.986 | 1.3390 | 0.0099819 | 0.16987 | 0.35093 | 0.00049199 | 0.00089894 |
| −5 | 35.440 | 29.210 | 1.3296 | 0.0111590 | 0.17338 | 0.35259 | 0.00049971 | 0.00089796 |
| 0 | 39.388 | 32.736 | 1.3201 | 0.0124440 | 0.17691 | 0.35424 | 0.00050739 | 0.00089705 |
| 5 | 43.664 | 36.581 | 1.3104 | 0.0138420 | 0.18046 | 0.35587 | 0.00051502 | 0.00089622 |
| 10 | 48.287 | 40.764 | 1.3007 | 0.0153620 | 0.18403 | 0.35749 | 0.0005226 | 0.00089545 |
| 15 | 53.274 | 45.304 | 1.2908 | 0.0170110 | 0.18762 | 0.35909 | 0.00053015 | 0.00089475 |
| 20 | 58.645 | 50.220 | 1.2807 | 0.0187990 | 0.19123 | 0.36068 | 0.00053766 | 0.00089410 |
| 25 | 64.416 | 55.532 | 1.2705 | 0.0207330 | 0.19487 | 0.36224 | 0.00054514 | 0.00089350 |
| 30 | 70.608 | 61.261 | 1.2602 | 0.0228250 | 0.19853 | 0.36379 | 0.00055259 | 0.00089295 |
| 35 | 77.239 | 67.427 | 1.2497 | 0.0250830 | 0.20222 | 0.36531 | 0.00056000 | 0.00089244 |
| 40 | 84.330 | 74.052 | 1.239 | 0.0275210 | 0.20593 | 0.36681 | 0.00056739 | 0.00089196 |
| 45 | 91.90 | 81.156 | 1.2281 | 0.030149 | 0.20967 | 0.36829 | 0.00057476 | 0.00089151 |
| 50 | 99.97 | 88.762 | 1.2170 | 0.032982 | 0.21344 | 0.36973 | 0.00058210 | 0.00089108 |
| 55 | 108.56 | 96.893 | 1.2057 | 0.036033 | 0.21724 | 0.37115 | 0.00058943 | 0.00089067 |
| 60 | 117.69 | 105.57 | 1.1941 | 0.039319 | 0.22108 | 0.37253 | 0.00059674 | 0.00089027 |
| 65 | 127.39 | 114.82 | 1.1823 | 0.042857 | 0.22494 | 0.37388 | 0.00060404 | 0.00088988 |
| 70 | 137.66 | 124.66 | 1.1702 | 0.046666 | 0.22885 | 0.37519 | 0.00061133 | 0.00088948 |
| 75 | 148.55 | 135.12 | 1.1578 | 0.050769 | 0.23279 | 0.37645 | 0.00061862 | 0.00088908 |
| 80 | 160.07 | 146.23 | 1.1451 | 0.055189 | 0.23678 | 0.37767 | 0.00062591 | 0.00088865 |
| 85 | 172.24 | 158.01 | 1.1320 | 0.059954 | 0.24080 | 0.37884 | 0.0006332 | 0.00088821 |
| 90 | 185.08 | 170.48 | 1.1186 | 0.065094 | 0.24488 | 0.37996 | 0.00064051 | 0.00088773 |
| 95 | 198.63 | 183.68 | 1.1047 | 0.070645 | 0.24900 | 0.38101 | 0.00064782 | 0.00088721 |

TABLE 5-continued

Disclosed Composition Properties Data.

Disclosed Composition Properties

| Temp (° F.) | Liquid Phase Pressure (psia) | Vapor Phase Pressure (psia) | Liquid Phase Density (g/cm3) | Vapor Phase Density (g/cm3) | Liquid Phase Enthalpy (kJ/g) | Vapor Phase Enthalpy (kJ/g) | Liquid Phase Entropy (kJ/gR) | Vapor Phase Entropy (kJ/gR) |
|---|---|---|---|---|---|---|---|---|
| 100 | 212.91 | 197.63 | 1.0904 | 0.076647 | 0.25318 | 0.38200 | 0.00065516 | 0.00088664 |
| 105 | 227.93 | 212.37 | 1.0755 | 0.083147 | 0.25742 | 0.38292 | 0.00066253 | 0.00088601 |
| 110 | 243.74 | 227.92 | 1.0601 | 0.090201 | 0.26172 | 0.38376 | 0.00066993 | 0.00088531 |
| 115 | 260.35 | 244.31 | 1.0440 | 0.097874 | 0.26609 | 0.38451 | 0.00067738 | 0.00088451 |
| 120 | 277.79 | 261.59 | 1.0272 | 0.10625 | 0.27053 | 0.38516 | 0.00068488 | 0.00088362 |
| 125 | 296.10 | 279.78 | 1.0096 | 0.11541 | 0.27507 | 0.38570 | 0.00069246 | 0.00088259 |

The properties data set forth in Table 5 include temperature, liquid phase pressure, vapor phase pressure, liquid phase density, vapor phase density, liquid phase entropy and vapor phase entropy.

Properties data for R22 refrigerant composition is described in Table 6:

these formulations. For example, at 30° F., the formulation of the present disclosure has a liquid vapor pressure of 70.608 psia, which is very close to the 69.651 psia of R22.

Figure 4:
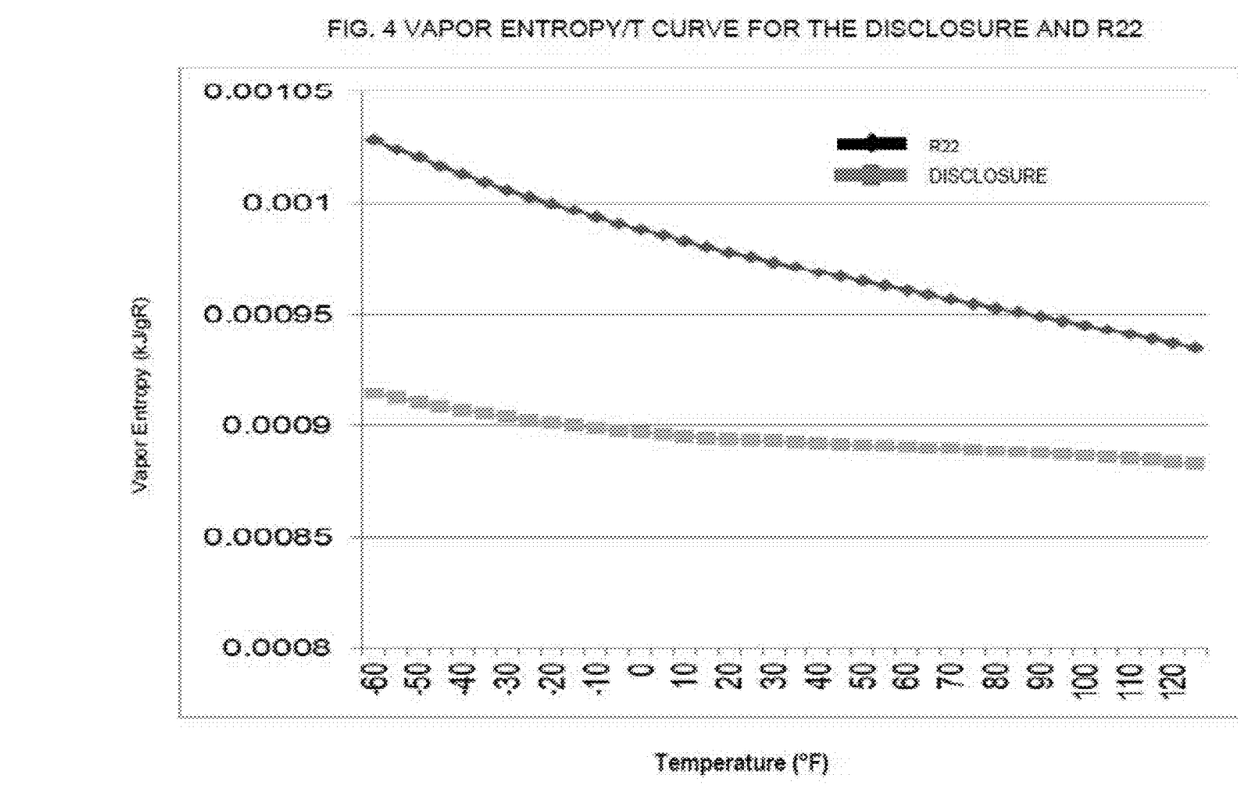
FIG. 4 depicts the vapor entropy curve of the refrigerant composition of the disclosure compared to R22.
Figure 5:
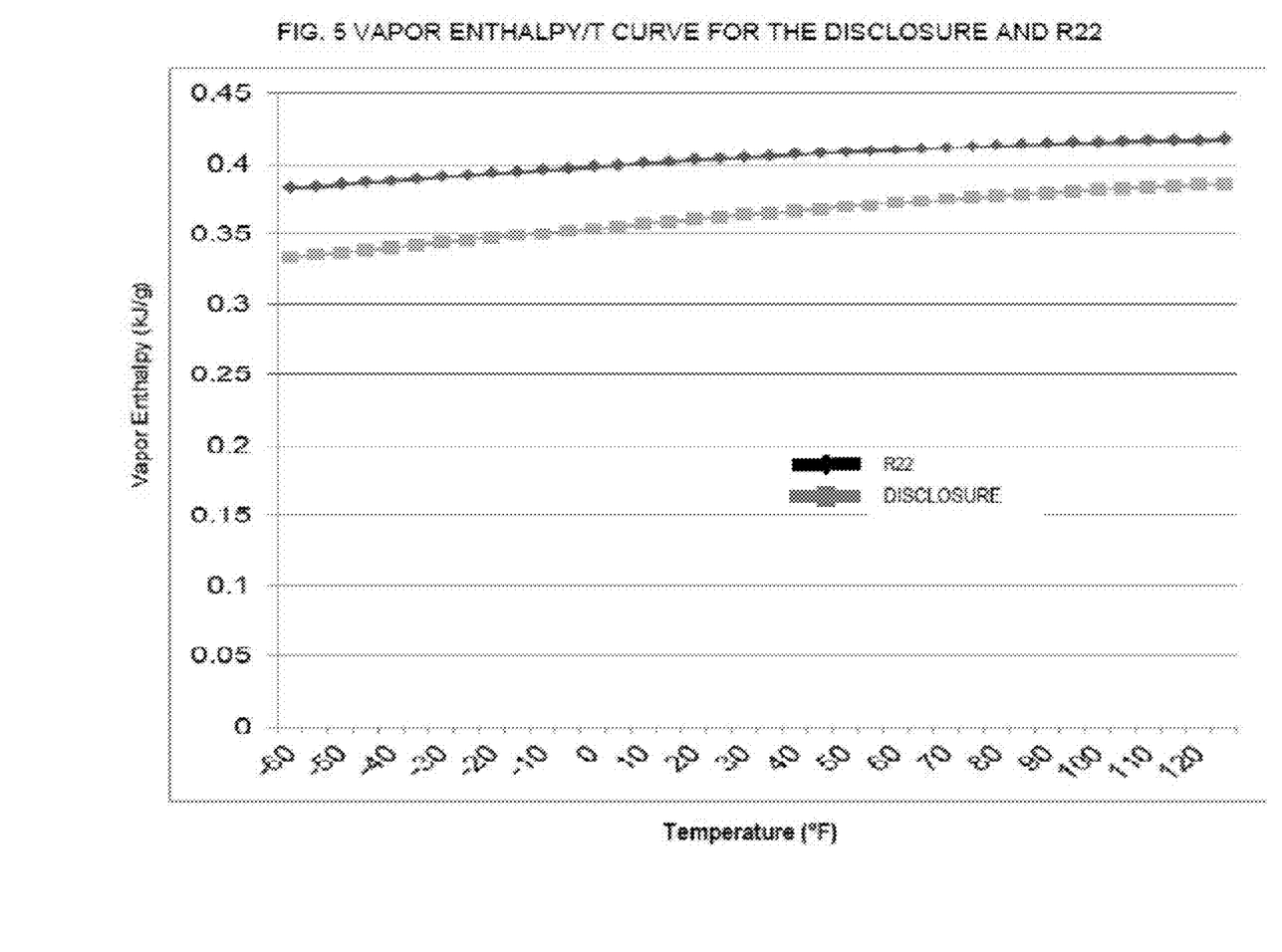
FIG. 5 depicts the vapor enthalpy curve of the refrigerant composition of the disclosure compared to R22.

FIG. 4 and FIG. 5 show the vapor entropy and vapor enthalpy curves, respectively, of the disclosed composition of the disclosure compared to R22, obtained from the data

TABLE 6

R22 Properties Data.

R22 Properties

| Temp (° F.) | Pressure (psia) (R22) | Liquid Density (g/cm3) | Vapor Density (g/cm3) | Liquid Enthalpy (kJ/g) | Vapor Enthalpy (kJ/g) | Liquid Entropy (kJ/gR) | Vapor Entropy (kJ/gR) |
|---|---|---|---|---|---|---|---|
| −60 | 8.836 | 1.4387 | 0.0029268 | 0.14283 | 0.38288 | 0.00042770 | 0.00102830 |
| −55 | 10.190 | 1.4309 | 0.0033425 | 0.14583 | 0.38421 | 0.00043515 | 0.00102420 |
| −50 | 11.703 | 1.4229 | 0.0038031 | 0.14884 | 0.38553 | 0.00044253 | 0.00102030 |
| −45 | 13.389 | 1.4149 | 0.0043121 | 0.15186 | 0.38683 | 0.00044984 | 0.00101650 |
| −40 | 15.262 | 1.4068 | 0.0048730 | 0.15489 | 0.38813 | 0.00045708 | 0.00101280 |
| −35 | 17.336 | 1.3987 | 0.0054893 | 0.15793 | 0.38941 | 0.00046425 | 0.00100930 |
| −30 | 19.624 | 1.3905 | 0.0061648 | 0.16098 | 0.39068 | 0.00047137 | 0.00100600 |
| −25 | 22.142 | 1.3822 | 0.0069034 | 0.16404 | 0.39194 | 0.00047842 | 0.00100270 |
| −20 | 24.905 | 1.3738 | 0.0077092 | 0.16711 | 0.39319 | 0.00048542 | 0.00099960 |
| −15 | 27.929 | 1.3654 | 0.0085864 | 0.17020 | 0.39442 | 0.00049237 | 0.00099660 |
| −10 | 31.230 | 1.3569 | 0.0095394 | 0.17330 | 0.39563 | 0.00049927 | 0.00099370 |
| −5 | 34.824 | 1.3483 | 0.0105730 | 0.17642 | 0.39682 | 0.00050612 | 0.00099088 |
| 0 | 38.728 | 1.3396 | 0.0116920 | 0.17955 | 0.39800 | 0.00051293 | 0.00098816 |
| 5 | 42.959 | 1.3308 | 0.0129010 | 0.18270 | 0.39916 | 0.00051969 | 0.00098553 |
| 10 | 47.536 | 1.3219 | 0.0142060 | 0.18586 | 0.40030 | 0.00052641 | 0.00098298 |
| 15 | 52.475 | 1.3129 | 0.0156120 | 0.18904 | 0.40142 | 0.00053309 | 0.00098051 |
| 20 | 57.794 | 1.3038 | 0.0171240 | 0.19224 | 0.40251 | 0.00053974 | 0.00097811 |
| 25 | 63.514 | 1.2946 | 0.0187500 | 0.19546 | 0.40359 | 0.00054635 | 0.00097577 |
| 30 | 69.651 | 1.2853 | 0.0204960 | 0.19870 | 0.40463 | 0.00055293 | 0.00097349 |
| 35 | 76.225 | 1.2758 | 0.0223680 | 0.20196 | 0.40566 | 0.00055948 | 0.00097127 |
| 40 | 83.255 | 1.2663 | 0.0243740 | 0.20524 | 0.40665 | 0.00056600 | 0.00096910 |
| 45 | 90.761 | 1.2565 | 0.0265220 | 0.20854 | 0.40762 | 0.00057250 | 0.00096697 |
| 50 | 98.763 | 1.2467 | 0.0288200 | 0.21187 | 0.40856 | 0.00057897 | 0.00096488 |
| 55 | 107.28 | 1.2367 | 0.031276 | 0.21522 | 0.40946 | 0.00058543 | 0.00096283 |
| 60 | 116.33 | 1.2265 | 0.033901 | 0.21860 | 0.41033 | 0.00059186 | 0.00096082 |
| 65 | 125.94 | 1.2162 | 0.036705 | 0.22200 | 0.41117 | 0.00059827 | 0.00095882 |
| 70 | 136.13 | 1.2057 | 0.039698 | 0.22543 | 0.41197 | 0.00060467 | 0.00095685 |
| 75 | 146.92 | 1.1950 | 0.042894 | 0.22890 | 0.41273 | 0.00061106 | 0.00095490 |
| 80 | 158.33 | 1.1841 | 0.046306 | 0.23239 | 0.41345 | 0.00061744 | 0.00095295 |
| 85 | 170.38 | 1.1730 | 0.049948 | 0.23591 | 0.41413 | 0.00062381 | 0.00095101 |
| 90 | 183.09 | 1.1616 | 0.053836 | 0.23947 | 0.41476 | 0.00063018 | 0.00094908 |
| 95 | 196.49 | 1.1501 | 0.057988 | 0.24307 | 0.41534 | 0.00063655 | 0.00094713 |
| 100 | 210.61 | 1.1382 | 0.062424 | 0.24671 | 0.41587 | 0.00064293 | 0.00094517 |
| 105 | 225.46 | 1.1261 | 0.067167 | 0.25039 | 0.41633 | 0.00064931 | 0.00094319 |
| 110 | 241.06 | 1.1136 | 0.072241 | 0.25411 | 0.41674 | 0.00065570 | 0.00094119 |
| 115 | 257.45 | 1.1008 | 0.077676 | 0.25788 | 0.41708 | 0.00066211 | 0.00093915 |
| 120 | 274.65 | 1.0877 | 0.083503 | 0.26170 | 0.41735 | 0.00066855 | 0.00093706 |
| 125 | 292.68 | 1.0741 | 0.089760 | 0.26558 | 0.41754 | 0.00067501 | 0.00093492 |

Comparison of the properties data of the disclosed composition of Table 5 and the properties of R22 of Table 6 demonstrate the close correspondence of the properties of in Tables 5 and 6. As can be seen, the property curves of the disclosed composition clearly tracks the corresponding property curves of R22. Notably, the entropy of the disclosed composition is less than that of R22, which indicates an improved work function for the refrigerant composition of the disclosure.

The compositions of the disclosure may also contain one or more additives such as oxidation resistance and thermal stability enhancers, corrosion inhibitors, metal deactivators, lubricity additives, viscosity index enhancers, pour and/or floc point depressants, detergents, dispersants, antifoaming agents, anti-wear agents, and extreme pressure resistant additives. Many additives are multifunctional. For example, certain additives may impart both anti-wear and extreme pressure resistance properties, or function both as a metal deactivator and a corrosion inhibitor. Cumulatively, all additives preferably do not exceed 8% by weight, or more preferably do not exceed 5% by weight, of the total composition.

An effective amount of the foregoing additive types is generally in the range from 0.01 to 5% for the antioxidant component, 0.01 to 5% for the corrosion inhibitor component, from 0.001 to 0.5% for the metal deactivator component, from 0.5 to 5% for the lubricity additives, from 0.01 to 2% for each of the viscosity index enhancers and pour and/or floc point depressants, from 0.1 to 5% for each of the detergents and dispersants, from 0.001 to 0.1% for antifoam agents, and from 0.1-2% for each of the anti-wear and extreme pressure resistance components. All these percentages are by weight and are based on the total composition. It is to be understood that more or less than the stated amounts of additives may be more suitable to particular circumstances, and that a single molecular type or a mixture of types may be used for each type of additive component. Also, the examples listed below are intended to be merely illustrative and not limiting.

Examples of oxidation resistance and thermal stability enhancers suitable for use in the present disclosure include, for example: diphenyl-, dinaphthyl-, and phenylnaphthyl-amines, in which the phenyl and naphthyl groups can be substituted, e.g., N,N'-diphenyl phenylenediamine, p-octyl-diphenylamine, p,p-dioctyldiphenylamine, N-phenyl-1-naphthyl amine, N-phenyl-2-naphthyl amine, N-(p-dodecyl) phenyl-2-naphthyl amine, di-1-naphthylamine, and di-2-naphthylamine; phenothiazines such as N-alkyl-phenothiazines; imino(bisbenzyl); hindered phenols such as 6-(t-butyl) phenol, 2,6-di-(t-butyl) phenol, 4-methyl-2,6-di-(t-butyl) phenol, 4,4'-methylenebis(2,6-di-{t-butyl} phenol); combinations of two or more thereof, and the like.

Examples of cuprous metal deactivators suitable for use in the present disclosure include, for example: imidazole, benzamidazole, 2-mercaptobenzthiazole, 2,5-dimercaptothiadi-azole, salicylidine-propylenediamine, pyrazole, benzotriazole, tolutriazole, 2-methylbenzamidazole, 3,5-imethyl pyrazole, and methylene bis-benzotriazole. Benzotriazole derivatives are preferred. Other examples of more general metal deactivators and/or corrosion inhibitors include organic acids and their esters, metal salts, and anhydrides, e.g., N-oleyl-sarcosine, sorbitan mono-oleate, lead naphthenate, dodecenyl-succinic acid and its partial esters and amides, and 4-nonylphenoxy acetic acid; primary, secondary, and tertiary aliphatic and cycloaliphatic amines and amine salts of organic and inorganic acids, e.g., oil-soluble alkylammonium carboxylates; heterocyclic nitrogen containing compounds, e.g., thiadiazoles, substituted imidazolines, and oxazolines; quinolines, quinones, and anthraquinones; propyl gallate; barium dinonyl naphthalene sulfonate; ester and amide derivatives of alkenyl succinic anhydrides or acids, dithiocarbamates, dithiophosphates; amine salts of alkyl acid phosphates and their derivatives.

Examples of suitable lubricity additives include long chain derivatives of fatty acids and natural oils, such as esters, amines, amides, imidazolines, and borates.

Examples of suitable viscosity index enhancers include polymethacrylates, copolymers of vinyl pyrrolidone, as well as, methacrylates, polybutenes, and styrene-acrylate copolymers.

Examples of suitable pour point and/or floc point depressants include polymethacrylates such as methacrylate-ethylene-vinyl acetate terpolymers; alkylated naphthalene derivatives; and products of Friedel-Crafts catalyzed condensation of urea with naphthalene or phenols.

Examples of suitable detergents and/or dispersants include polybutenylsuccinic acid amides; polybutenyl phosphonic acid derivatives; long chain alkyl substituted aromatic sulfonic acids and their salts; and metal salts of alkyl sulfides, of alkyl phenols, and of condensation products of alkyl phenols and aldehydes.

Examples of suitable antifoam agents include silicone polymers and acrylates.

Examples of suitable anti-wear and extreme pressure resistance agents include sulfurized fatty acids and fatty acid esters, such as sulfurized octyl tallate; sulfurized terpenes; sulfurized olefins; organopolysulfides; organophosphorus derivatives including amine phosphates, alkyl acid phosphates, dialkyl phosphates, aminedithiophosphates, trialkyl and triaryl phosphorothionates, trialkyl and triaryl phosphines, and dialkylphosphites, e.g., amine salts of phosphoric acid monohexyl ester, amine salts of dinonylnaphthalene sulfonate, triphenyl phosphate, trinaphthyl phosphate, diphenyl cresyl and dicresyl phenyl phosphates, naphthyl diphenyl phosphate, triphenylphosphorothionate; dithiocarbamates, such as an antimony dialkyl dithiocarbamate; chlorinated and/or fluorinated hydrocarbons, and xanthates.

An effective amount of the foregoing additive types is generally in the range from about 0.01 to about 5% for the antioxidant component, about 0.01 to about 5% for the corrosion inhibitor component, from about 0.001 to about 0.5% for the metal deactivator component, from about 0.5 to about 5% for the lubricity additives, from about 0.01 to about 2% for each of the viscosity index enhancers and pour and/or floc point depressants, from about 0.1 to about 5% for each of the detergents and dispersants, from about 0.001 to about 0.1% for antifoam agents, and from about 0.1 to about 2% for each of the anti-wear and extreme pressure resistance components. All these percentages are by weight and are based on the total composition. It is to be understood that more or less than the stated amounts of additives may be more suitable to particular circumstances, and that a single molecular type or a mixture of types may be used for each type of additive component. As used herein, the term "effective amount" means the amount of each component which upon combination with the other component or components, results in the formation of the present compositions.

Many of the aforementioned additives are multifunctional. For example, certain additives may impart both anti-wear and extreme pressure resistance properties, or function both as a metal deactivator and a corrosion inhibitor. Cumulatively, all additives preferably do not exceed about 8% by weight, or more preferably do not exceed about 5% by weight, of the total composition.

The refrigerant composition of the present disclosure can be used as an original OEM refrigerant or for a drop-in replacement for equipment using R22. The composition of the present application can also be used as a drop-in for HFC refrigerants such as R421A, R421B, R416A, R417A, R422A, R422C, etc.

Figure 6:
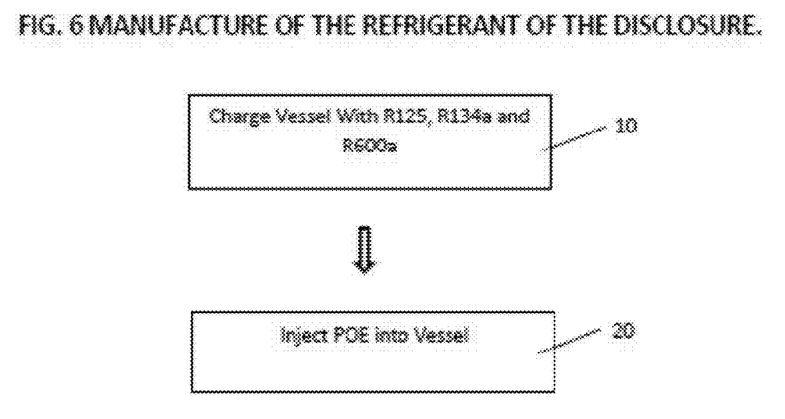
FIG. 6 is a block diagram of a method of manufacturing the refrigerant composition of the disclosure.

FIG. 6 is a block diagram of the manufacture of the refrigerant composition of the disclosure in a single vessel. In step 10, the vessel is charged with R125, R134a and R600a to make a 100% charge. Subsequently, in step 20, the appropriate amount of POE is injected into the vessel to attain the refrigerant composition of the disclosure.

Figure 7:
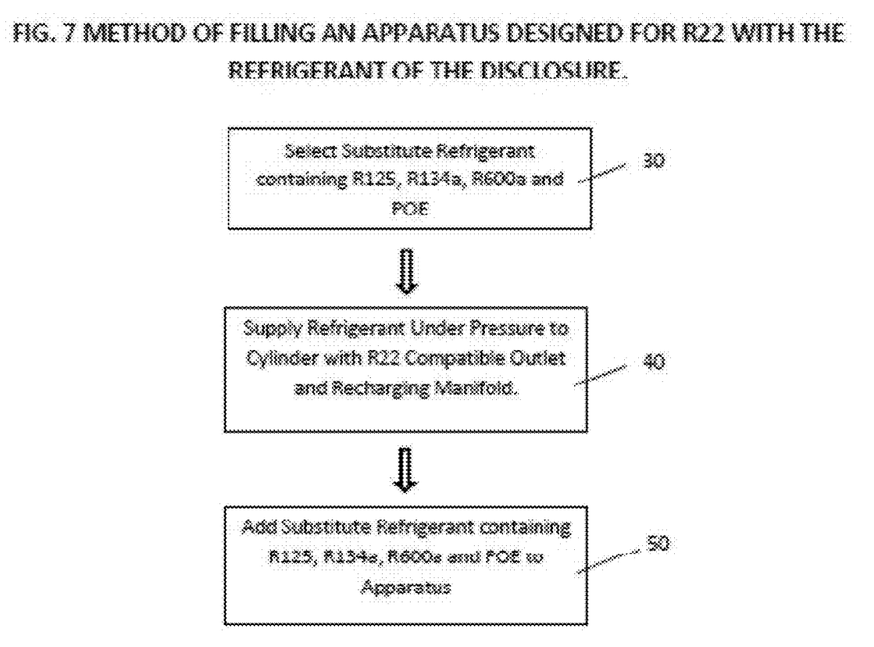
FIG. 7 is a block diagram of a method of filling an apparatus designed for R22 with the refrigerant of the disclosure

The refrigerant composition of the disclosure can be used as a drop in replacement for R22. As is shown in FIG. 7, step 30 is the selection of a substitute refrigerant formed from R125, R134a, R600a, and POE. Next, in step 40 the refrigerant of the disclosure is supplied under pressure to a cylinder and an R22 compatible outlet and recharging manifold. Then, in step 50, the substitute refrigerant of the disclosure is added to the R22 compatible apparatus.

Charging the air conditioner or refrigerator is performed using a charging cylinder designed to meter out a desired amount of a specific refrigerant by weight. Compensation for temperature variations is accomplished by reading the pressure on the gauge of the cylinder and dialing, using a calibrated chart, to the corresponding pressure reading for the refrigerant being used. When charging a refrigeration or air conditioning system with refrigerant, often the pressure in the system reaches a point where it is equal to the pressure in the charging cylinder from which the system is being charged. In order to get more refrigerant into the system to complete the charge, heat must be applied to the cylinder.

In an exemplary embodiment, a standard 25 or 30 lb cylinder can be used, which is charged under pressure with the refrigerant composition of the current disclosure. This cylinder is fitted with an outlet compatible with R22. The outlet is connected to a recharging manifold of the apparatus to be charged.

The disclosure is not restricted to POE lubricant. Other lubricants can include mineral or hydrocarbon oil, alkyl benzene oil, white or paraffinic oil and mixtures thereof. The amount of lubricating oil is an amount effective to provide acceptable lubrication to the compressor parts for its longevity. An effective amount of these conventional lubricating oils is the amount recommended by the equipment manufacturer. Typically, the conventional lubricating oil is present in an amount of from about 1 to about 60 wt %. The present disclosure has unexpectedly found the amount of POE to be less than about 1%, as little as about 0.67 wt %, with even 0.4 wt % giving excellent lubrication. The range in which POE can be present can be from about 0.1 wt % to about 5 wt %

The POE of the present disclosure can be obtained by introducing neopentyl polyol material, aliphatic monocarboxylic acid material and a catalytic quantity of acid catalyst material into a reaction zone, whereby a reaction mixture is formed, the neopentyl polyol material being at least one neopentyl polyol represented by the structural formula:

in which each R is independently selected from $CH_3$, $C_2H_5$ and $CH_2OH$. The aliphatic monocarboxylic acid material is at least one aliphatic hydrocarbon monocarboxylic acid, and the acid catalyst material is at least one acid esterification catalyst, wherein the initial concentration of the aliphatic monocarboxylic acid material in the reaction mixture is such as to provide an initial mole ratio of carboxyl groups to hydroxyl groups in the reaction mixture from about 0.25:1 to about 0.5:1, and, while the reaction mixture is established and maintained at 170-200° C., aliphatic monocarboxylic acid vapor and water vapor are withdrawn from the reaction zone.

Another approach would be to produce a poly(neopentylpolyol) ester composition by (I) reacting a neopentylpolyol having the formula:

wherein each R is independently selected from the group consisting of CH3, C2H5 and CH2OH and n is a number from 1 to 4, with at least one monocarboxylic acid having 2 to 15 carbon atoms in the presence of an acid catalyst and at an initial mole ratio of carboxyl groups to hydroxyl groups of greater than 0.5:1 to 0.95:1 to form a partially esterified poly(neopentylpolyol) composition; and (ii) reacting the partially esterified poly(neopentylpolyol) composition produced in (i) with additional monocarboxylic acid having 2 to 15 carbon atoms to form a final poly(neopentylpolyol) ester composition.

The properties of the POE of the present disclosure can be in the viscosity range of about 20 to 45 cSt at 40° C. (104° F.) and 3 to 7 cSt at 100° C. (212° F.). The viscosity index should be in the range of about 100 to 130. The pour point should be in the range of about −40 to −50° C. (−40 to −58° F.). The density at 20° C. (68° F.) should be in the range of about 0.97 to 0.98 g/ml. The flash point should be in the range of about 240 to 270° C. (464 to 518° F.). The acid value should be less than about 0.05 mg KOH/g.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

What is claimed is:

1. A refrigerant composition, comprising:
about 53-56 wt. % pentafluoroethane;
about 40-44 wt % 1,1,1,2-tetrafluoroethane;
about 1-5 wt % isobutane; and
0.3-0.7 wt % polyol ester.

2. The refrigerant composition of claim 1, wherein the refrigerant composition comprises:
about 54-56 wt. % pentafluoroethane;
about 41-43 wt % 1,1,1,2-tetrafluoroethane; and
about 2-4 wt % isobutane.

3. The refrigerant composition of claim 1, wherein the refrigerant composition comprises:
about 54.6 wt. % pentafluoroethane;
about 41.7 wt % 1,1,1,2-tetrafluoroethane;
about 3.0 wt % isobutane; and
about 0.7 wt % polyol ester.

4. The refrigerant composition of claim 1, wherein the refrigerant composition comprises:
about 54.63 wt. % pentafluoroethane;
about 41.72 wt % 1,1,1,2-tetrafluoroethane;
about 2.98 wt % isobutane; and
about 0.67 wt % polyol ester.

5. The refrigerant composition of claim 1, wherein the polyol ester has a viscosity of about 32.5 cSt at 40° C. and about 5.8 cSt at 100° C.

6. The refrigerant composition of claim 1, wherein the polyol ester has a pour point of about −46° C. and a density of about 0.98 g/ml at 20° C.

7. The refrigerant composition of claim 1, wherein the refrigerant composition has a global warming potential of about 2525 compared to carbon dioxide.

8. The refrigerant composition of claim 1, wherein the refrigerant composition has a theoretical boiling point of about −37.9° C.

9. The refrigerant composition of claim 1, wherein the refrigerant composition further comprises at least one additive selected from the group consisting of oxidation resistance and thermal stability enhancers, corrosion inhibitors, metal deactivators, lubricity additives, viscosity index enhancers, pour and/or floc point depressants, detergents, dispersants, antifoaming agents, anti-wear agents, and extreme pressure resistant additives.

10. A method for manufacturing a refrigerant composition, the method comprising:
charging a vessel with a refrigerant composition having:
about 55 wt % pentafluoroethane,
about 42 wt % 1,1,1,2-tetrafluoroethane, and
about 3% isobutane for a 100% charge; and
injecting into the vessel 0.3-0.7 wt % polyol ester, based on the 100% charge.

11. The method of claim 10, wherein the polyol ester has a pour point of about −46° C., and a density of about 0.98 g/ml at 20° C.

12. The method of claim 10, wherein the refrigerant composition has a global warming potential of about 2525 compared to carbon dioxide.

13. The method of claim 10, wherein the refrigerant composition has a theoretical boiling point of about −37.9° C.

14. The method of claim 10, wherein the refrigerant composition further comprises at least one additive selected from the group consisting of oxidation resistance and thermal stability enhancers, corrosion inhibitors, metal deactivators, lubricity additives, viscosity index enhancers, pour and/or floc point depressants, detergents, dispersants, antifoaming agents, anti-wear agents, and extreme pressure resistant additives.

15. A method for filling an apparatus designed for use with a chlorodifluoromethane refrigerant, the method comprising:
selecting a substitute refrigerant composition comprising
about 53-57 wt % pentafluoroethane,
about 40-44 wt % 1,1,1,2-tetrafluoroethane,
about 1-5 wt % isobutane, and
0.3-0.7 wt % polyol ester;
supplying the substitute refrigerant composition under pressure in a cylinder fitted with an outlet compatible with a chlorodifluoromethane recharging manifold of the apparatus; and
adding to the apparatus the substitute refrigerant composition.

16. The method of claim 15, wherein the polyol ester has a pour point of about −46° C. and a density of about 0.977 g/ml at 20° C.

17. The method of claim 15, wherein the refrigerant composition has a vapor pressure of about 136.4 psi at 21° C. and a theoretical boiling point of about −37.9° C.

18. The method of claim 15, wherein the refrigerant composition further comprises at least one additive selected from the group consisting of oxidation resistance and thermal stability enhancers, corrosion inhibitors, metal deactivators, lubricity additives, viscosity index enhancers, pour and/or floc point depressants, detergents, dispersants, antifoaming agents, anti-wear agents, and extreme pressure resistant additives.

* * * * *